United States Patent
Englund et al.

(10) Patent No.: US 7,488,142 B2
(45) Date of Patent: Feb. 10, 2009

(54) TOOL FOR CHIP REMOVING MACHINING AS WELL AS A CUTTING BODY FOR SUCH TOOLS

(75) Inventors: Kjell Englund, Valbo (SE); Jörgen Wiman, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 189 days.

(21) Appl. No.: 11/600,278

(22) Filed: Nov. 16, 2006

(65) Prior Publication Data

US 2007/0122242 A1 May 31, 2007

(30) Foreign Application Priority Data

Nov. 21, 2005 (SE) .................................. 0502554

(51) Int. Cl.
*B23B 27/16* (2006.01)
*B26D 1/00* (2006.01)
(52) U.S. Cl. ...................... 407/107; 407/103
(58) Field of Classification Search .................. 407/80, 407/83, 103, 104, 66, 107, 109, 110
See application file for complete search history.

(56) References Cited

U.S. PATENT DOCUMENTS 5,924,826 A * 7/1999 Bystrom et al. ............. 407/103
6,086,291 A * 7/2000 Hansson et al. ............. 407/110
6,146,061 A * 11/2000 Larsson ....................... 407/103
6,343,898 B1 * 2/2002 Sjoo et al. ................... 407/101
7,121,771 B2 * 10/2006 Englund ...................... 407/103

FOREIGN PATENT DOCUMENTS

| DE | 34 46 455 | 6/1986 |
| DE | 198 47 227 | 4/2000 |
| EP | 1 366 840 | 12/2003 |
| EP | 1 535 681 | 6/2005 |

* cited by examiner

*Primary Examiner*—Willmon Fridie
(74) *Attorney, Agent, or Firm*—Drinker Biddle & Reath LLP (57) ABSTRACT

A cutting tool includes a basic body and a cutting body that is fixable to the basic body via a male/female coupling. The coupling includes male-like fingers and female-like seats, which are delimited between elastically resilient projections. Each finger includes two converging wedge surfaces, which are pressable against a pair of diverging support surfaces of two adjacent projections. The axial angle of convergence of the two wedge surfaces of an individual finger differ from the angle of divergence of the two co-operating support surfaces of the projections, as long as the fingers are not loaded against the projections. In such a way, the removal of the cutting body from the basic body is facilitated.

12 Claims, 11 Drawing Sheets

Fig 15 ed tool. Thus,
TOOL FOR CHIP REMOVING MACHINING AS WELL AS A CUTTING BODY FOR SUCH TOOLS

CROSS-REFERENCE TO RELATED APPLICATIONS

This application claims priority under 35 U.S.C. § 119 to Swedish Patent Application No. 0502554-9, filed on Nov. 21, 2005, the disclosure of which is incorporated by reference herein in its entirety.

BACKGROUND OF THE INVENTION

1. Field of the Invention

In a first aspect, this invention relates to a tool intended for chip removing machining.

In a second aspect, the invention also relates to a replaceable cutting body as such, suitable for use in the tool according to the invention.

2. Description of Related Art

Within all main disciplines of the technique for chip removing or cutting machining (turning, milling and drilling), tools are used that are composed of a fixed or rotatable basic body and at least one replaceable cutting insert. In order to obtain optimum dimensional accuracy of the usually metallic workpieces being machined, it is vital that the cutting insert is fixed to the basic body in a stable, reliable and solid-geometrically exact way. For this reason, recently there have been developed a number of different connecting interfaces between the cutting inserts and the insert seats formed in the basic bodies and in which the cutting inserts are applied. Contrary to the planar and numerous contact surfaces, which previously have been present to hold the cutting inserts in place in the insert seats, the modern connecting interfaces are based on a combination of male and female elements engaging each other, which among other things have the purpose of counteracting turning of the cutting insert in relation to the insert seat. Therefore, the connecting interfaces are frequently also called male/female couplings.

Tools are previously known of the type initially mentioned, which make use of a number of rim-like spaced-apart, male-like fingers on the cutting insert, as well as a number of spaced-apart and elastically resilient projections in the insert seat of the basic body, wherein the fingers may be pressed in and be wedged up in seats between the projections. In doing so, the resilient projections are bent away and apply a spring force to the fingers, which powerfully and tightly presses the contact or wedge surfaces of the fingers against co-operating support surfaces on the projections. The different embodiments of connecting interfaces presented in the known tools have given promising results with respect to the capability of, in cooperation with a tightening member, e.g., a screw, fixing the cutting insert in a stable and exact way in the insert seat. However, a disadvantage has appeared in the form of difficulties to detach the cutting insert from the insert seat in connection with the cutting insert being replaced. Thus, after loosening of the tightening screw, the fingers of the cutting insert are fixed in a self-locking way by such a force that the cutting insert cannot be picked away manually by the fingers of the hand, but only by means of mechanical tools, such as a hammer and pliers. This disadvantage is not acceptable in connection with practical, everyday use of the tools, since frequent insert exchanges have to be possible to be carried out in a smooth and fast way. Another disadvantage is that it may be difficult to bring the fingers into the seats initially. In such a way, the work of the operator is further delayed.

BRIEF SUMMARY OF THE INVENTION

An object of the invention is to obviate the above-mentioned disadvantages of previously known tools of the type initially mentioned, and at providing an improved tool. Thus, a primary object of the invention, in a first aspect, is to provide a cutting tool, the cutting insert or cutting body of which can be detached and be dismounted from the appurtenant insert seat in a simple and smooth way without unnecessary waste of time. An additional object is to provide a tool, the connecting interface of which between the cutting body and the insert seat of the basic body has improved properties in respect of the stability and exact position of the cutting body, in particular in repeated use of the basic body and the insert seat thereof for a large number of cutting bodies. Another object of the invention is to provide a tool, the main components of which, i.e., the cutting body and the basic body, respectively, can be manufactured in a simple and economical way. In particular, the cutting body should be possible to be made from cemented carbide by direct pressing, i.e., without the need of grinding, and guaranteeing good precision in respect of the solid-geometrical position in relation to the basic body.

In an embodiment, the invention provides a tool for chip removing machining. The tool includes a basic body, a replaceable cutting body, a male/female coupling between the basic body and the cutting body, and a tightening member. The male/female coupling includes a plurality of male-like fingers, which are peripherally spaced-apart around an axis, and at least equally as many spaced-apart seats into which the fingers can be pressed axially. Each individual finger includes an underside, a free end, and a pair of opposite wedge surfaces that converge at axial angle of convergence toward the underside. Each seat is delimited between elastically resilient projections that define pairs of support surfaces of adjacent projections. The support surfaces diverge at an angle of divergence. The fingers, upon pressing-in toward a lower end position, have the purpose of bending away the projections, while the fingers are wedged up between the projections and are subjected to a spring force from the same. The axial angle of convergence of the two wedge surfaces of each individual finger differs from the angle of divergence of the pair of cooperating support surfaces of the projections in the state when the projections are not loaded by the fingers. The tightening member fixes together the basic body and the cutting body.

In an embodiment, the invention also provides a cutting body of a tool for chip removing machining. The cutting body includes a plurality of male-like fingers peripherally spaced-apart around an axis. The fingers are situated in a common cross-plane with respect to the axis, and each of the fingers includes an underside, a free end, and two wedge surfaces that are formed on opposite sides. The two wedge surfaces on a respective finger converge axially toward the underside of the finger at an axial angle of convergence, and also converge radially toward the free end of the finger at a radial angle of convergence.

In an embodiment, the invention further provides a tool for chip removing machining. The tool includes a male coupling that is disposed on a first one of a basic body and a replaceable cutting body, and includes a female coupling that is disposed on a second one of the basic body and the replaceable cutting body. The male coupling includes a plurality of fingers that are disposed equi-angularly about an axis. Each of the plurality of fingers includes an underside, a free end spaced from the axis, and a pair of opposite wedge surfaces that extend to the free end and converge at axial angle of convergence toward the underside. The female coupling includes a plurality of seats. A corresponding pair of projections defines each of the plurality of seats, and each of the projections includes a support surface such that a pair of support surfaces defined by the corresponding pair of projections diverges at an angle of divergence that differs from the axial angle of convergence.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

DETAILED DESCRIPTION OF THE PREFERRED EMBODIMENTS

Figures 1, 2:
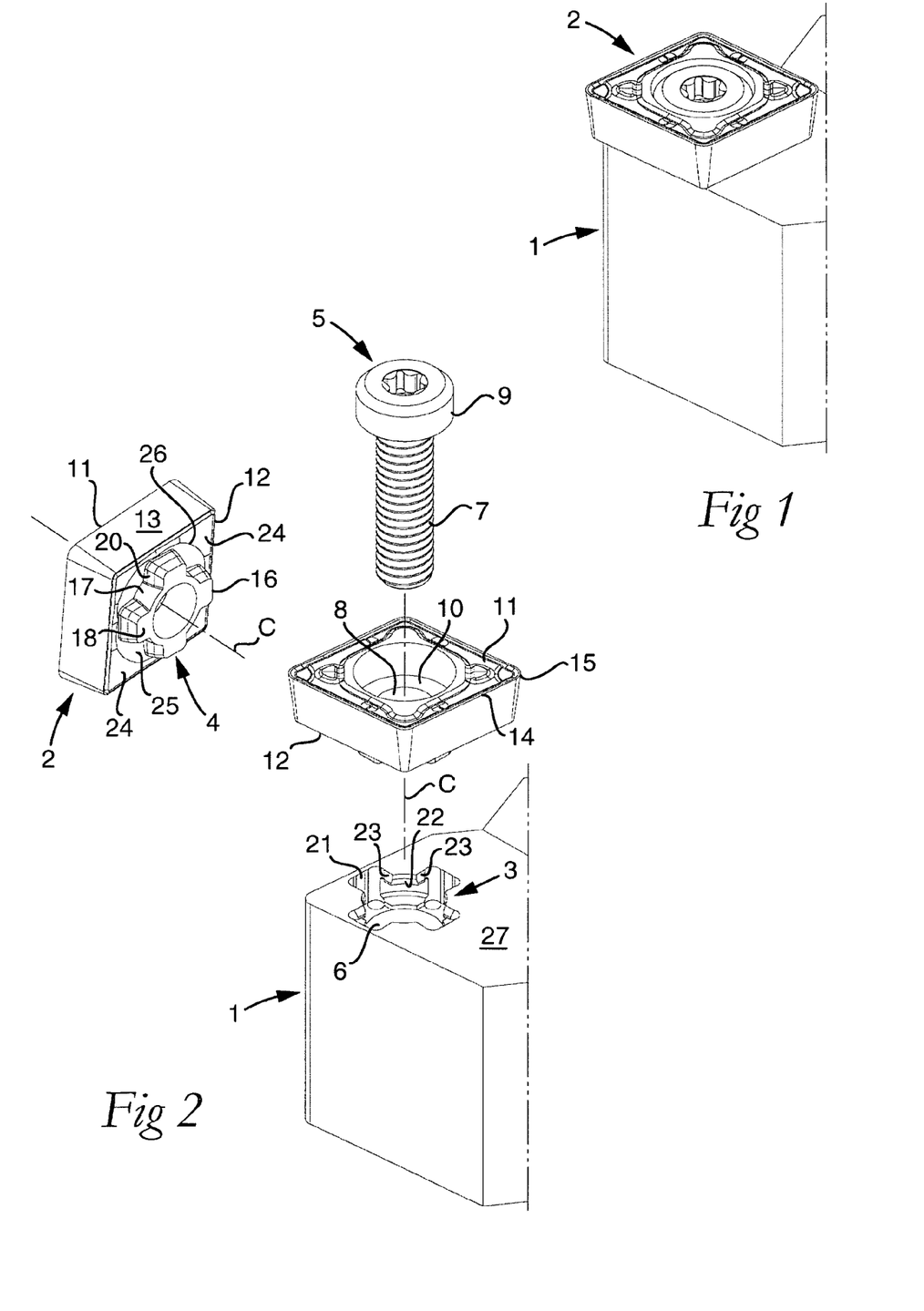
FIG. 1 is a partial perspective view showing an example of a cutting tool in the form of a turning tool, where the invention is applied, a cutting body included in the tool being shown in a mounted state on an appurtenant basic body.
FIG. 2 is a perspective exploded view showing the cutting body and a tightening screw of the same spaced-apart from the basic body and an insert seat included in the same, wherein it should be noted that one and the same cutting body is shown from above as well as from below.

In FIGS. 1 and 2, a tool is shown, which in a traditional way comprises a basic body or holder 1 and a replaceable cutting body 2, which is manufactured from a hard and wear-resistant material. In the example, the tool is in the form of a turning tool, the basic body 1, which is preferably steel, while the cutting body 2 may be manufactured from cemented carbide and have a flat basic shape.

In the basic body 1, an insert seat 3 is formed in the form of a female-like recess into which a male member 4 on the underside of the cutting body 2 can be pressed in and fixed by means of a tightening member 5, which in this case is a screw. In the bottom of the insert seat 3, a hole 6 is formed with a female thread (not visible) in which the male thread 7 of the screw 5 can be fastened. A center axis of the hole 6 is designated C. In order to allow the screw to be tightened in the threaded hole 6, the cutting body 2 is formed with a through hole 8, which like the hole 6 is defined by a center axis C, which should coincide with the center axis C of the insert seat 3 when the cutting body 2 is fixed in the insert seat 3. In this connection, it should be mentioned that the screw 5 includes a head 9, which in this case is flat and has a planar, ring-shaped contact surface (not visible) for pressing against a ring-shaped, planar shoulder surface 10, which surrounds the hole 8.

In the example shown, the cutting body 2 is in the form of a cemented carbide plate having a quadrangular, viz. slightly rhombic shape, which is defined by a top side 11, an underside 12 and four side surfaces 13, which form clearance surfaces. The four straight edges 14 that form transitions between the top side 11 and the clearance surfaces 13 serve as major cutting edges, which at the four corners of the cutting plate transform into surface-wiping secondary edges 15.

In this case, the male member 4 on the underside of the cutting body 2 is formed with four fingers 16, which protrude radially from a common ring-shaped wall or ring 17. Each individual finger 16 includes an underside 18 and a free, peripheral end 19 (see also FIG. 3). On the opposite sides thereof, the finger 16 is formed with contact surfaces 20 (only one of which for each finger is visible in FIG. 3), which converge in the downward direction toward the underside 18 of the finger, i.e., axially. As a consequence of this convergence, the surfaces 20 will be wedged up against co-operating surfaces in the insert seat 3. For this reason, henceforth the surfaces 20 are referred to as "wedge surfaces."

Figure 3:
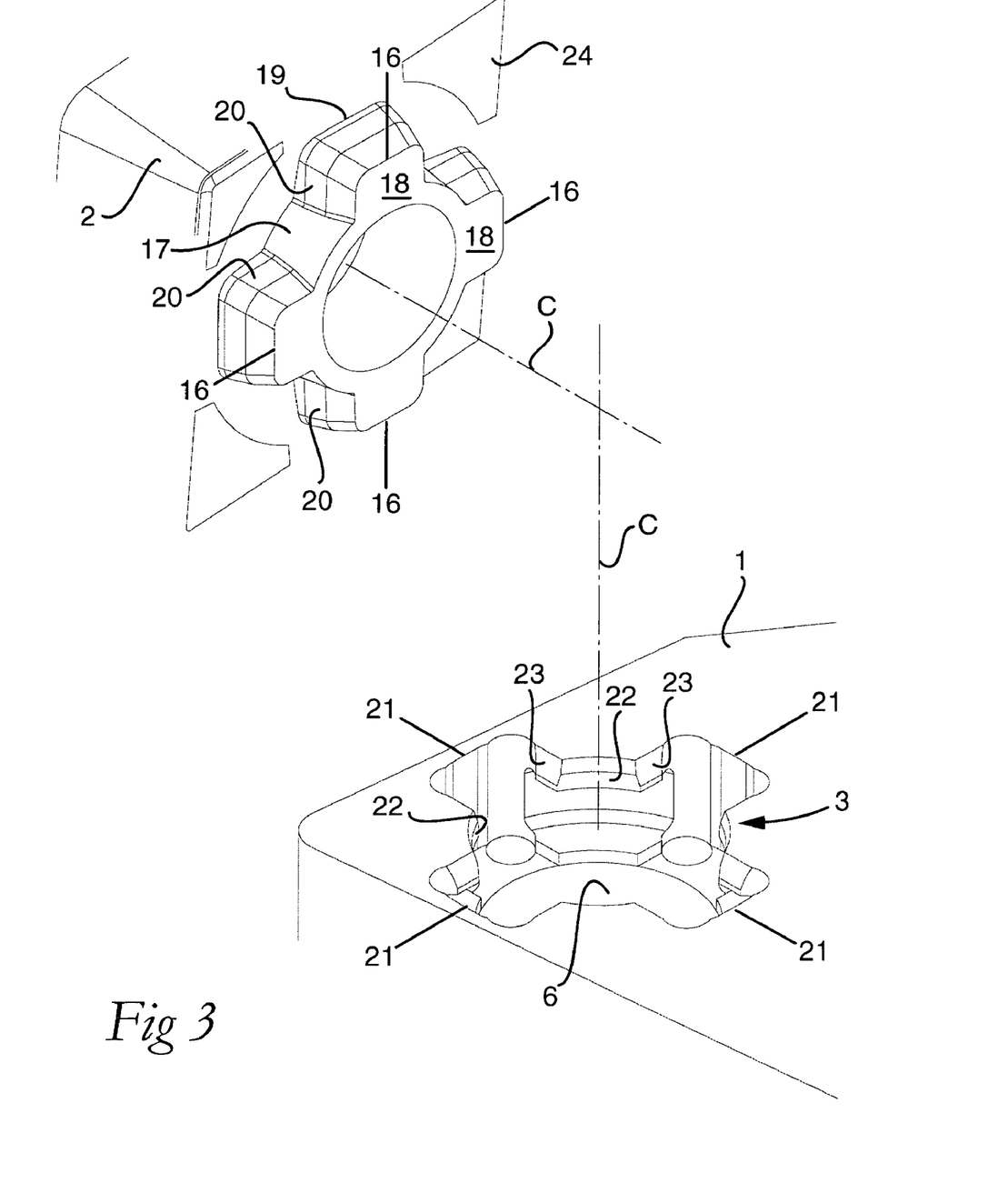
FIG. 3 is a perspective exploded view, which on an enlarged scale illustrates a male member included in the cutting body, as well as the insert seat of the basic body.

In the example, the insert seat 3 is formed with an equally large number of seats 21 as the number of fingers 16 on the cutting body 2, e.g., four, the seats 21 being geometrically arranged in the same way as the fingers 16 so that the same can be inserted into the seats 21. The seats 21 extend radially outward from a common, central hollow space, and are mutually spaced-apart by means of leaf- or flap-like projections 22, which on opposite sides have support surfaces 23 against which the wedge surfaces of the fingers 16 can be pressed. Because the projections 22 have a limited thickness, counted as the distance between the top sides and the undersides (in practice 0.4-0.8 mm), and because the material of the basic body 1, e.g., steel, has a certain inherent elasticity, the projections 22 will be elastically resilient so that they can spring away in the downward direction, when the male member 4 is pressed into the insert seat 3.

The two opposite support surfaces 23, which together delimit the individual seat 21, diverge in the direction upward in order to receive the wedge surfaces 20 of the fingers 16 converging in the downward direction. For the sake of clarity of description, when the surfaces 20, 23, and the angles thereof, are described henceforth, the pairs of support surfaces 23 will be described as diverging, in spite of the fact that they also are converging, viz. in the downward direction.

An unacceptable disadvantage of the known tools is the difficulty of detaching the male member of the cutting body from the insert seat, when the tightening screw has been unscrewed. Furthermore, the contact between the wedge surfaces of the fingers and the support surfaces of the seats becomes insufficient and unreliable. Although surface contact is aimed at, in practice, only point contact or partial surface contact has been obtained in the known tools. Another disadvantage of the previously known tools is that the male member of the cutting body has to be located in very exact correspondence with the insert seat in order to be possible to be inserted into the same.

The present invention aims at obviating the above-mentioned disadvantages, more precisely by providing a new, improved connecting interface between the cutting body and the basic body.

With continued reference to FIG. 2, it should first be noticed that the underside 12 of the cutting body 2 does not extend in a single continuous plane. On the contrary, the underside includes four corner-wise located surface fields 24, which are planar and situated in a common cross-plane perpendicular to the center axis C. Inside the corner surface fields 24, a countersunk surface 25 is formed, which advantageously is concavely arched and delimited inside a generally ring-shaped limiting edge 26. It should be noted that the male member 16, in its entirety, is present inside the limiting edge 26.

Furthermore, it should be mentioned that the surface 27 of the basic body 1 that surrounds the hollow space 6 and is part of the insert seat 3, is planar. When the cutting body 2 is correctly fixed in the insert seat 3, the corner surfaces 24 of the cutting body should abut against the planar surface 27 of the basic body 1.

Figure 4:
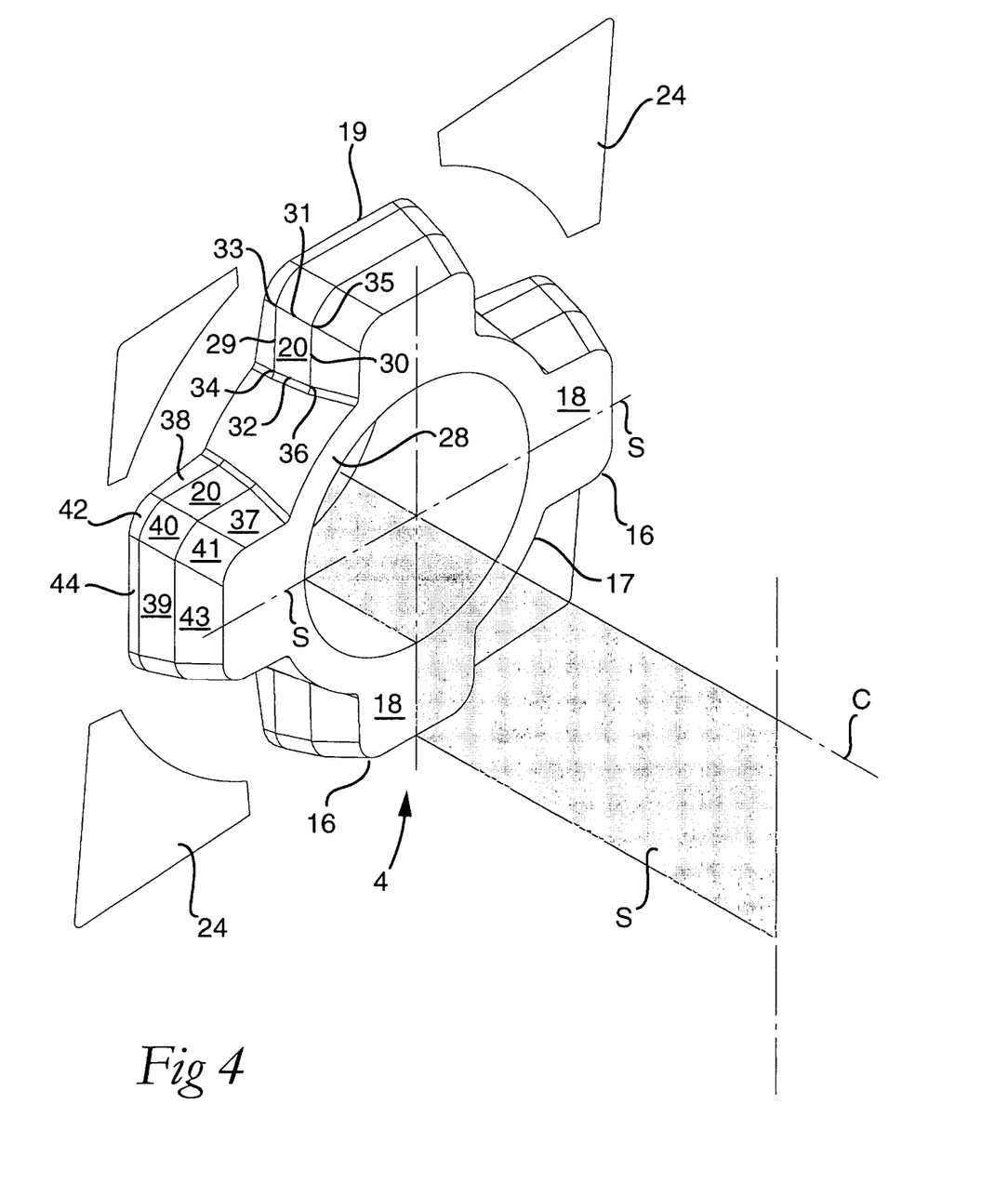
FIG. 4 is an additional enlarged perspective view of the male member only.
Figure 5:
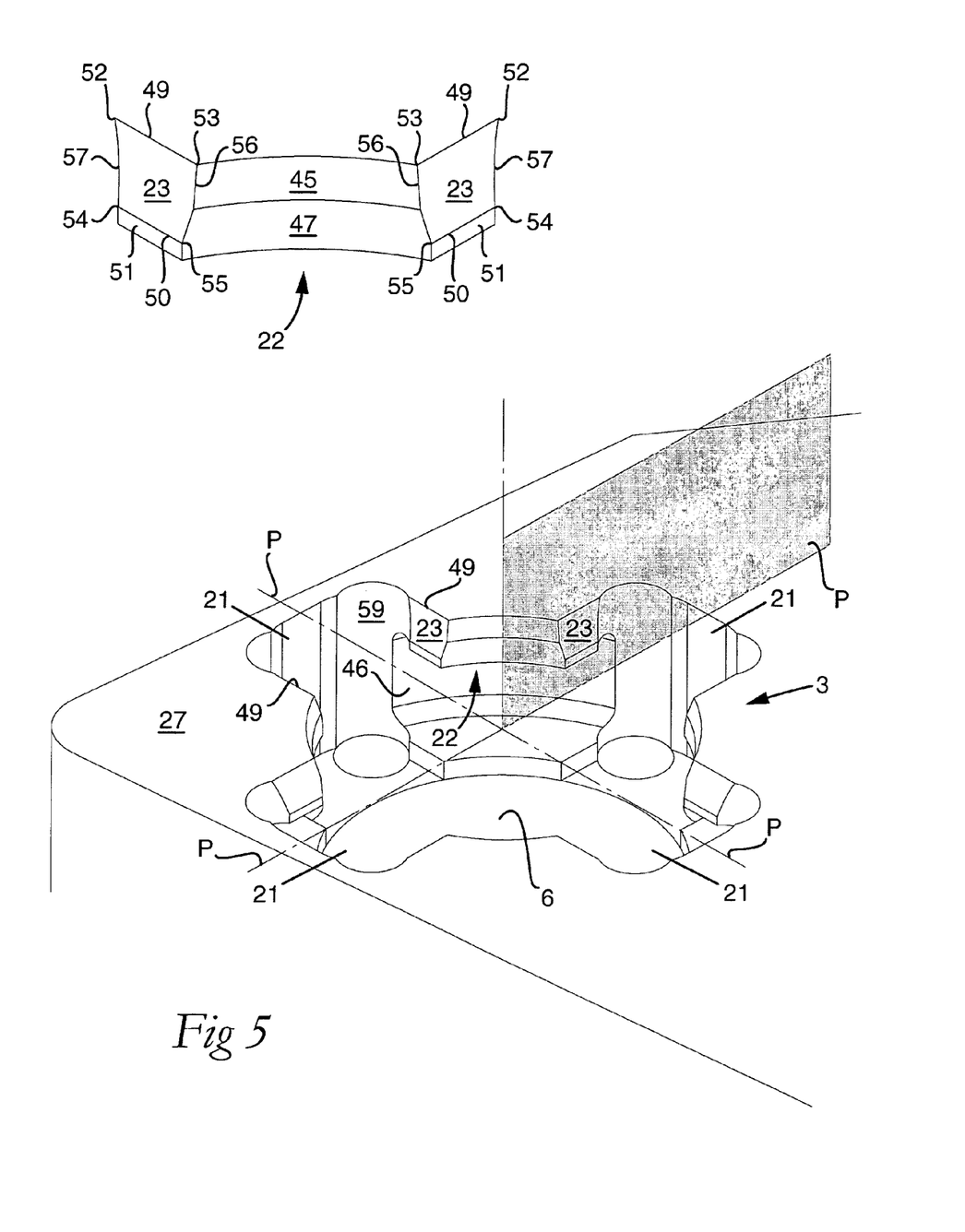
FIG. 5 is an enlarged perspective view of the insert seat, a projection included in the same being shown separately on an extremely enlarged scale.

Reference is now made to FIGS. 3-5, which in detail illustrate the new connecting interface according to the invention. Since the different details have to be illustrated on a very enlarged scale, substantially only the male member 4 and the insert seat 3, respectively, are shown in FIG. 3, but not other parts of the cutting body 2 and the basic body 1, respectively. The four fingers 16, which are included in the male member 4, are identical and peripherally spaced-apart along the central ring wall 17. More precisely, the fingers 16 are equidistantly spaced-apart, the spacing between the same amounting to 90°. The two side surfaces or wedge surfaces 20 of each individual finger 16 are situated at equally large distances from a common symmetry plane S, which is shown in the form of a screened field. The symmetry planes of the other fingers 16 are shown only in the form of simple, dash-dotted lines. Each such symmetry plane S extends radially from the center axis C. In this connection, it should be pointed out that the four fingers 16 generally are located in a common cross-plane, which extends perpendicularly to the center axis C (and is parallel to the underside of the cutting plate). In the example shown, the undersides 18 of the fingers transform directly, i.e., without interruption, into the lower end surface 28 of the ring wall 17. In other words, the surfaces 18, 28 form a continuous, planar and ring-shaped surface, which extends in the cross-plane.

One of a plurality of characteristic features of the two wedge surfaces 20 of each individual finger 16 is that they converge at a certain angle toward the underside 18. This is most clearly seen in FIG. 11, in which the angle of convergence is designated $\alpha$.

In FIGS. 3 and 4, it is further seen that the individual wedge surface 20, in this case, has a tetragonal contour shape. More precisely, the surface 20 is delimited by upper and lower limiting lines 29, 30, as well as outer and inner limiting lines 31, 32 (end lines). All lines 29-32 are in the form of straight turning lines against adjacent surfaces of the respective finger 16. The upper limiting line 29 ends in outer and inner corner points 33, 34, while the lower limiting line 30 correspondingly ends in outer and inner corner points 35, 36. In the embodiment of the tool shown in FIGS. 1-12, the wedge surfaces 20 are planar.

In accordance with a preferred embodiment of the invention, a guide surface, which is designated 37, is formed between the individual wedge surface 20 and the underside 18 of the finger. Together with an analogous guide surface 37 (see FIG. 11) on the opposite side of the finger 16, a surface pair is formed, which converges toward the underside of the finger. The angle of convergence $\beta$ of these surfaces 37 is greater than the angle of convergence $\alpha$ of the surfaces 20. By means of the guide surfaces 37, the operator's possibilities of quickly finding the correct position for the male member 4 upon insertion in the insert seat 3 are improved.

Figure 11:
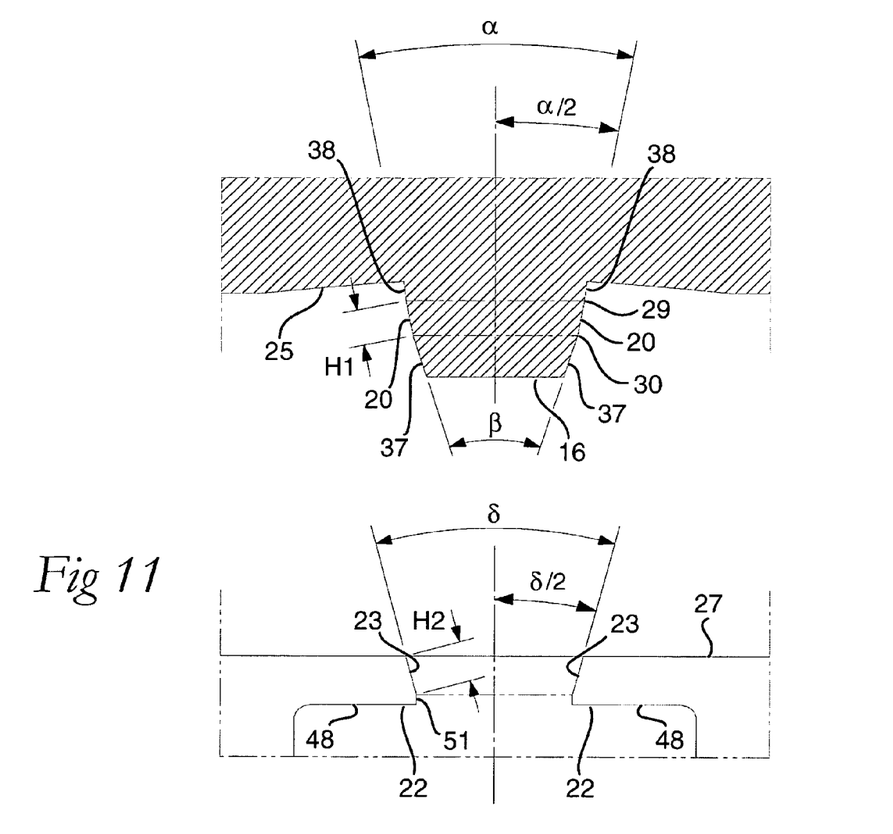
FIG. 11 is an exploded view, which on a very enlarged scale shows a section through a finger included in the male member, as well as a section through a seat delimited between adjacent projections in the insert seat for the receipt of the finger.
Figure 12:
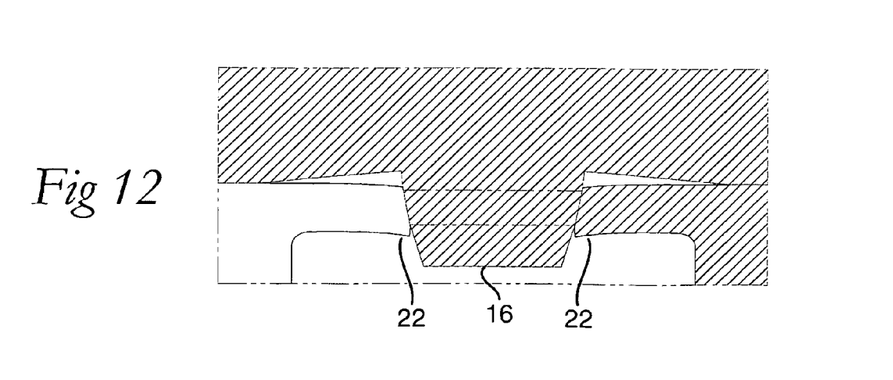
FIG. 12 is a section showing the finger in engagement with the seat.

With continued reference to FIG. 4 as well as FIG. 11, it should be noticed that particular chamfer surfaces 38 or concave surfaces are formed between the upper limiting lines 29 of the wedge surfaces 20 and the underside of the cutting body 2, more precisely in the form of the countersunk, central surface 25 (which advantageously is concavely arched). From the lines 29, the surfaces 38 turn off in the direction inward. In other words, the two wedge surfaces 20 are spaced a distance from the underside of the cutting body 2.

In conclusion, it should be mentioned that the individual wedge surface 20 (see FIG. 4) transforms into a front-end surface 39 via a rounded corner surface 40. Analogous, rounded corner surfaces 41, 42 form transitions between the surfaces 37, 38 and a front guide surface 43 and a front chamfer surface 44, respectively.

Figure 6:
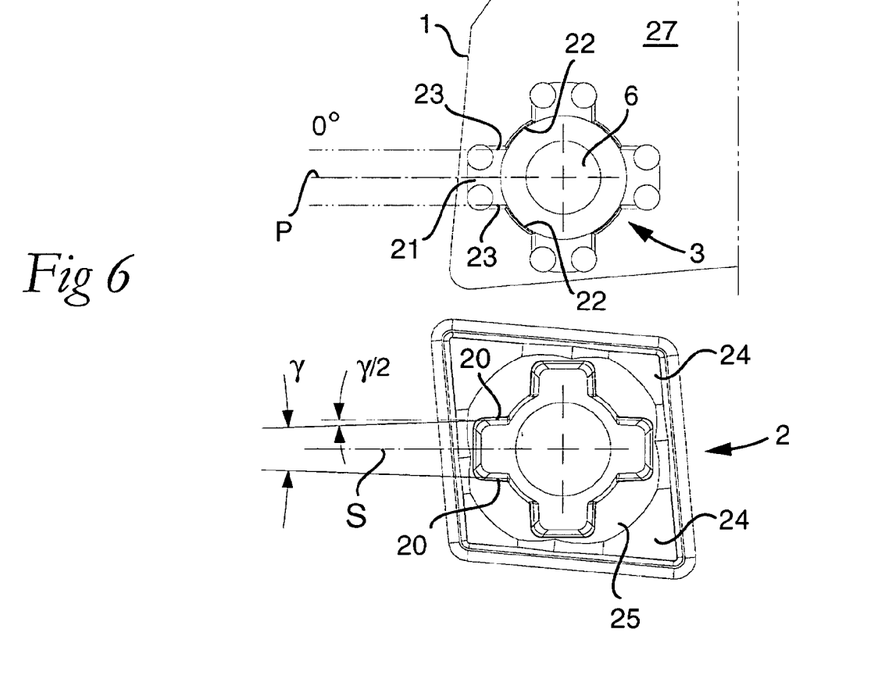
FIG. 6 is an exploded view showing the insert seat from above, as well as the cutting body from below in a state in which the male member of the cutting body is imagined to be separated from the insert seat.

In the embodiment of the invention shown in FIGS. 1-12, the pair of wedge surfaces 20 of each finger converges not only in the axial direction, i.e., toward the underside 18 of the finger, but also in the radial direction, i.e., toward the free end 19 of the finger. This is seen in FIG. 6, in which the radial angle of convergence of the wedge surfaces 20 is designated $\gamma$.

By the fact that the two opposite wedge surfaces 20 of each finger 16 converge not only axially (toward the underside 18), but also radially (toward the front end surface 39 of the finger 16), it follows that the corner point 35 between the lines 30, 31 is situated closer to the symmetry plane S of the finger 16 than the corner point 36, and the corner point 33 is situated closer to the symmetry plane S than the fourth corner point 34. In other words, the finger 16 tapers simultaneously in two different directions, viz. axially downward and radially outward.

Contrary to the fingers 16 of the male member 4, which have the free ends thereof pointing outward, the elastic projections or flaps 22 (see FIGS. 3 and 5) are formed with the free ends thereof pointing inward, viz. toward the center axis C of the insert seat 3. The projections 22 are, in a known way, provided by the fact that recesses 46 have been formed in the material below the same, e.g., by milling. Generally, each individual projection 22 has a tapering shape in the direction inward, and is delimited by, in addition to the two diverging support surfaces 23, a concavely arched or curved end surface 47, which defines the free end of the projection 22. Above the end surface 47, a chamfer surface 45 is formed. Upward, the projection 22 is delimited by the planar surface 27 of the basic body 1. Downward, in this case the same is delimited by a planar underside 48 (see FIG. 11).

Like the wedge surfaces 20 of the fingers 16 of the cutting body 2, the support surfaces 23 of the seats 21 are in this case planar. More precisely, the surfaces 23 are delimited between an upper limiting line 49 and a lower limiting line 50, which separates the support surface 23 from a lower chamfer surface 51. In the example, the support surfaces 23 of one and the same projection 22 extend generally perpendicularly to each other, such that the angle between, for instance, the two upper limiting lines 49, 49 is right. Here, it should be observed that the pair of support surfaces 23, which co-operate with one and the same finger 16 of the cutting body 2, are not formed on one and the same projection 22. Thus, the support surfaces 23, which co-operate with one and the same finger 16, are placed on opposite sides of a common seat 21, the support surfaces 23 being situated at equally large distances from a symmetry plane designated P, which in analogy with the previously described symmetry plane S extends radially out from the center axis C. Furthermore, the support surfaces 23 are inclined in one and the same angle in relation to the symmetry plane P, more precisely in such a way that the surfaces diverge axially in the upward direction at an angle of divergence δ, such as is shown in FIG. 11.

In accordance with the invention, the angle of divergence δ of the support surfaces 23 is greater than the axial angle of convergence α of the wedge surfaces 20, as long as the projections 22 are unloaded, i.e., in an inactive state before a respective individual finger 16 has been pressed into the appurtenant insert seat 3. In such a way, a clearance is provided between the individual support surface 23 and the co-operating wedge surface 20. This clearance counteracts the tendency of so-called self-locking, which arises if the angles α and δ would be equally large. Hence, experiments made indicate that the clearances on both sides of the finger 16 provided by the angular difference contribute to lifting up the male member 4 of the cutting body 2 from the insert seat 3, when the tightening screw 5 is loosened.

Before the function of the connecting interface in connection with the fixation and loosening, respectively, of the cutting body 2 is described more in detail, it should be pointed out that, reference being made to FIG. 5, the upper limiting line 49 of each support surface 23 ends in outer and inner corner points 52, 53, while the lower limiting line 50 ends in an outer corner point 54 and an inner corner point 55. The two inner and outer ends of the surface 23 are defined by limiting lines 56, 57.

Figure 8:
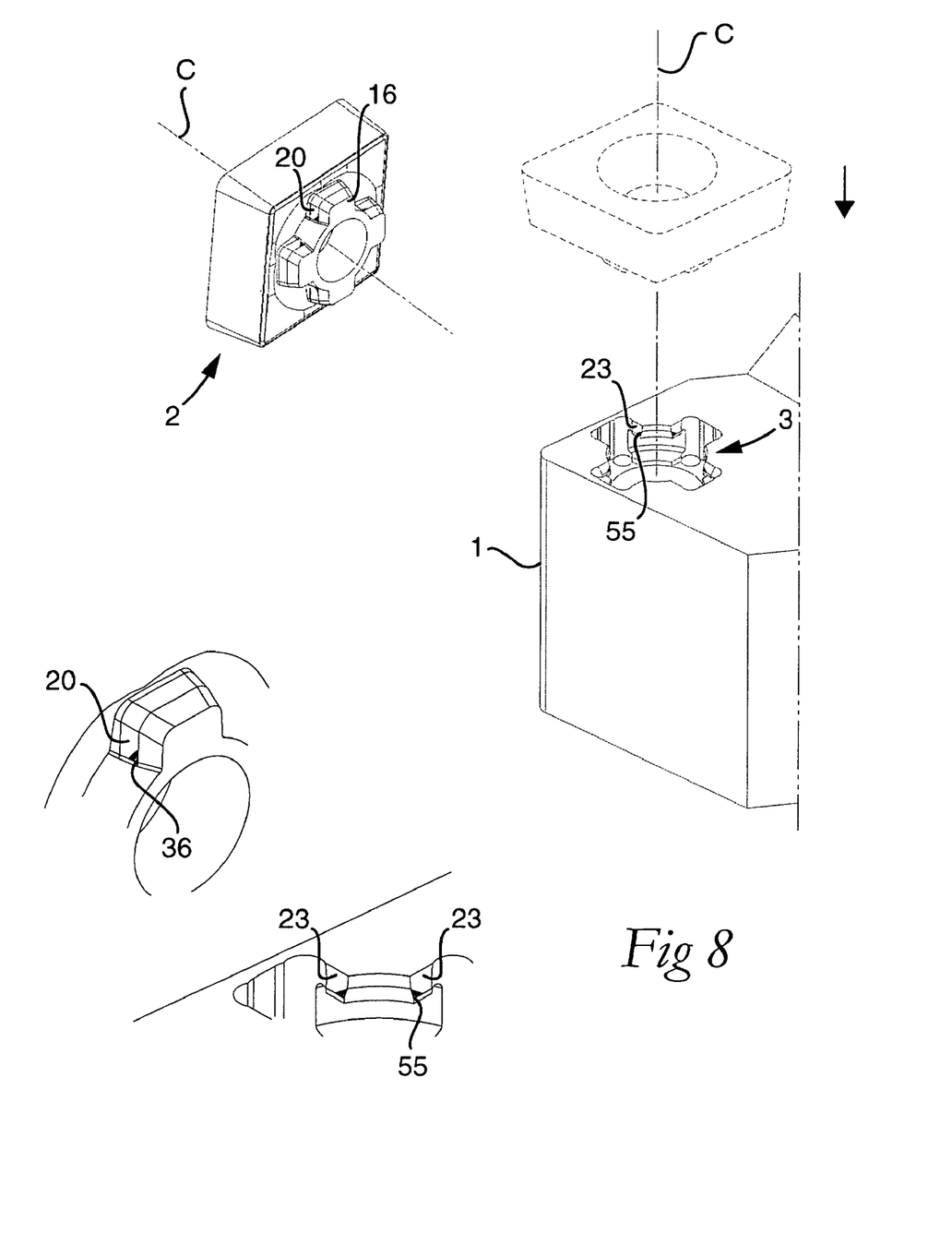
FIGS. 8-10 are a series of pictures in the form of perspective exploded views of the cutting body and the insert seat in three different states, viz. a state shown in FIG. 8, in which the male member of the cutting body is completely separated from the insert seat (see also FIG. 6), an intermediate state shown in FIG. 9, in which the male member of the cutting body is imagined to be partly pressed into the insert seat, and a state shown in FIG. 10, in which the male member of the cutting body is imagined to be completely pressed in and fixed in an end position in the insert seat (compare FIG. 7), all figures also containing partial detail enlargements of co-operating wedge and support surfaces.
Figure 9:
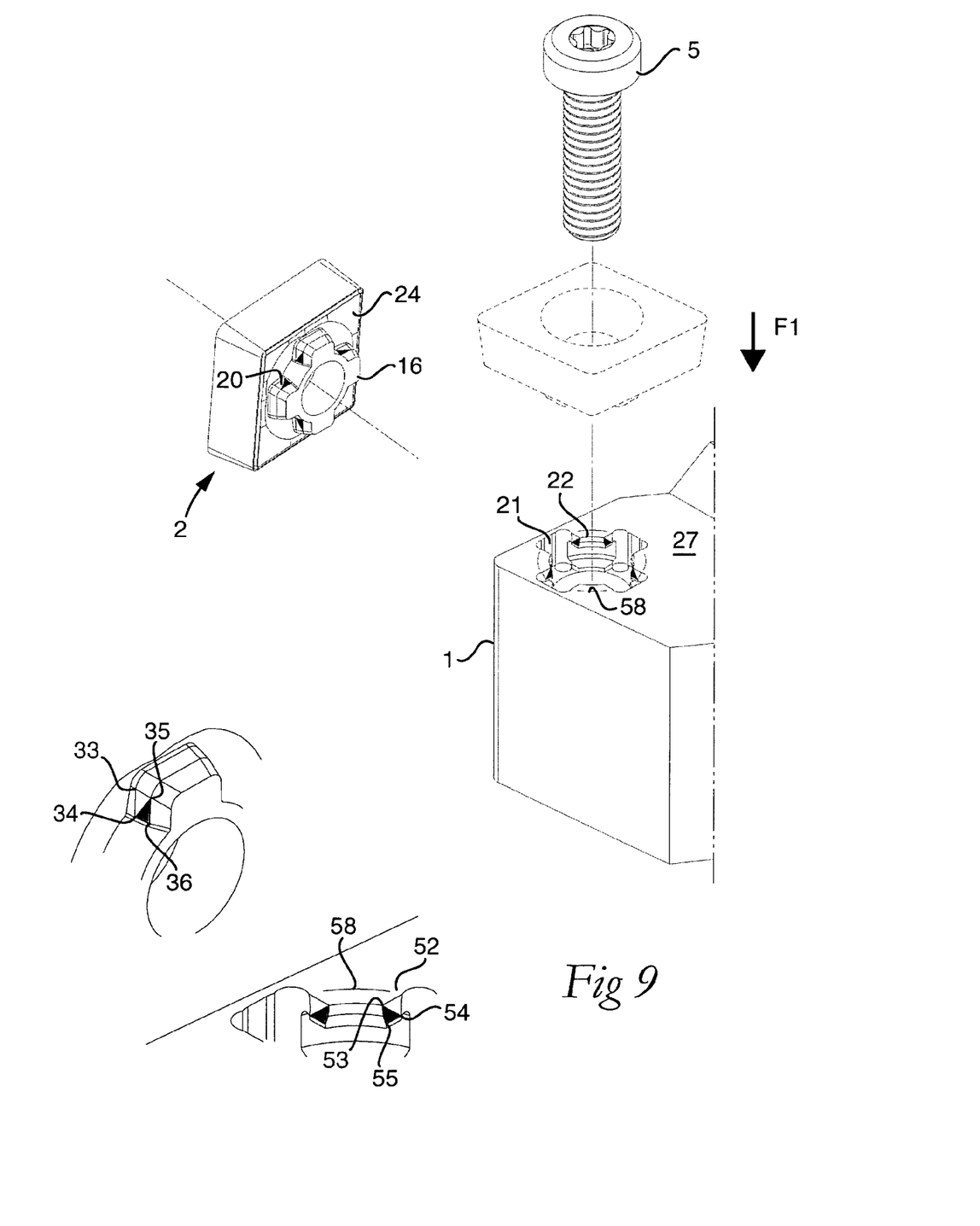
Figure 10:
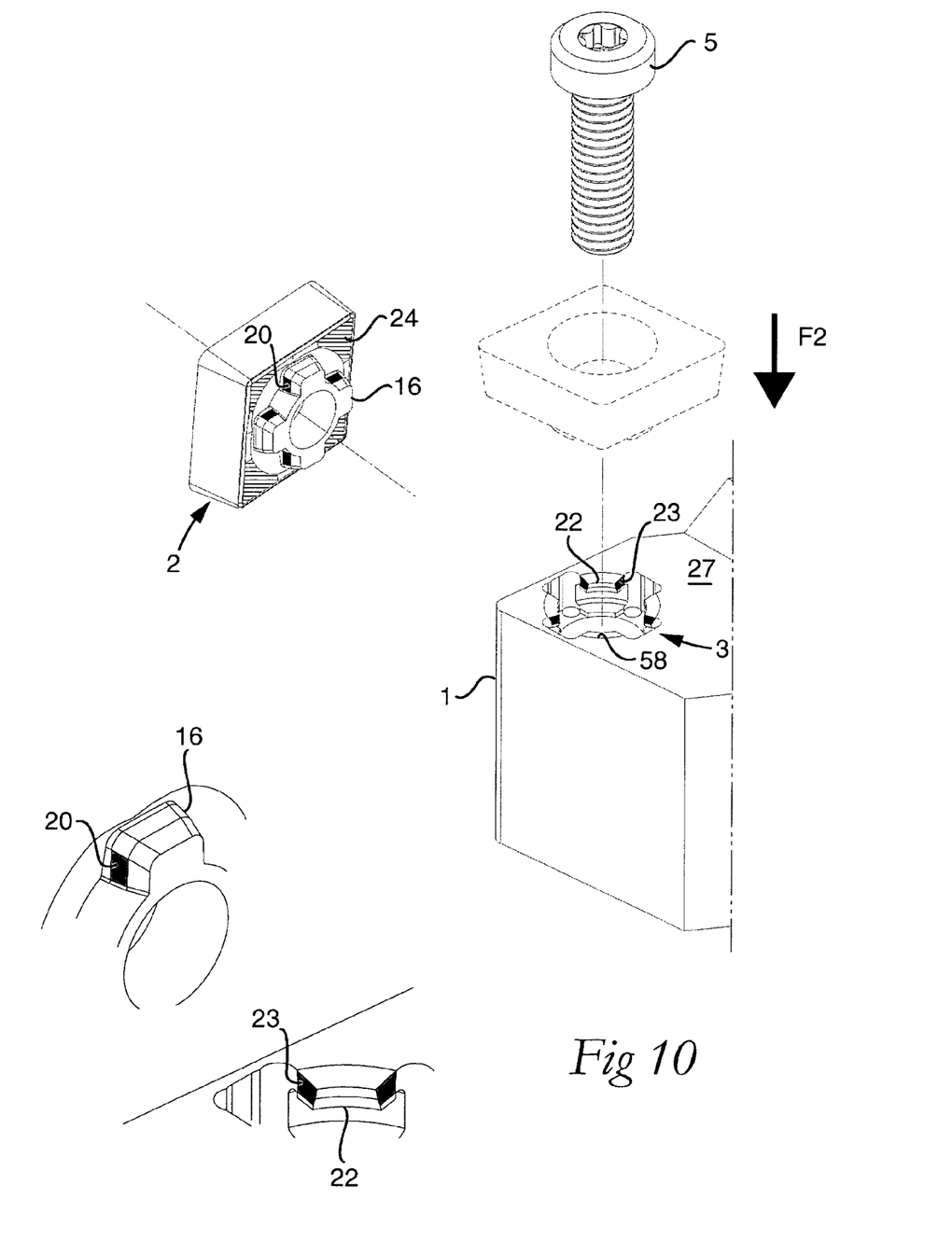

In order to illustrate the function of the described connecting interface in connection with the fixation of the cutting body 2 in the insert seat 3, reference is now made to the series of pictures in FIGS. 8-10. In all figures, the cutting body 2 is shown spaced-apart from the basic body 1 in order to expose the different co-operating surfaces as clearly as possible. However, in the state according to FIG. 8, the male member 4 of the cutting body 2 is imagined to be initially inserted in a manual way in the insert seat 3, but without the screw 5 having been applied in the appurtenant hole. The insertion may, for instance, be effected by means of the fingers of the hand; wherein a moderate force is applied to the cutting body 2, such as is illustrated by the diminutive arrow in FIG. 8. In the next step, which is shown in FIG. 9, the tightening screw 5 has been applied in the appurtenant hole 6 and has been screwed in a distance, wherein a significant pressing force is applied to the cutting body 2, such as is illustrated by the arrow F1. It should be observed that the planar corner surfaces 24 on the underside of the cutting plate here still have no contact with the surface 27 of the basic body 1. Finally, in FIG. 10, the cutting body 2 is shown in a state in which the tightening screw 5 is imagined to be fully tightened, such as is illustrated by arrow F2, the corner surfaces 24 having been brought into full surface contact with the surface 27 of the basic body.

As is seen in FIG. 8, initially only point contact is achieved, or very limited surface contact, between the wedge surfaces 20 of the fingers 16 and the corresponding support surfaces 23 in the insert seat 3. More precisely, contact arises, on one hand, between a limited surface portion in the immediate vicinity of the inner and lower corner point 36 of the individual wedge surface 20 (see also FIG. 4), and on the other hand the corner point 55 of the individual support surface 23. Here, it should be pointed out that the distance between the two corner points 36 of the opposite sides of a finger 16 are somewhat greater than the corresponding distance between the two corner points 55 in an insert seat 3 (the difference may amount to approximately 0.05-0.1 mm). In this initial state, double clearances are present between the surfaces 20 and 23, so far that the limiting line 30 clears radially in the direction outward from the corresponding lower limiting line 50 of the support surface 23, at the same time as the inner limiting line 32 of the wedge surface 20 clears in the direction upward in relation to the limiting line 56 of the support surface 23. By the marked compressive force F1 that is applied to the cutting body 2 by the screw 5 in the state according to FIG. 9, the elastic projections 22 begin to bend in the downward direction, such as is illustrated with the arched lines 58 in FIG. 9. This deflection is effected by the fact that the frictional forces at the contact points or surfaces near the corners 36 and 55 respectively convey the free ends of the projections 22, when the cutting body 2 and the fingers 16 thereof successively are pressed down axially in the insert seat 3. In this connection, the contact between the wedge surfaces 20 and the support surfaces 23 will successively be enlarged, such as is outlined in FIG. 9. More precisely, the contact zones extend in the direction from the corner 36 (along the wedge surface 20) toward the corner 34 as well as the corner 35, in order to finally reach up to the area of the corner 33, and in an analogous way (as regards the support surface 23) from the corner 55 toward the corner 53 as well as the corner 54, in order to finally reach the corner 52. When the screw 5 has been finally tightened, so that the contact surfaces 24 have been pressed against the surface 27, full contact has accordingly been established between the wedge surfaces 20 and the support surfaces 23, such as is shown in FIG. 10 by means of the screened fields along the surfaces.

Figure 7:
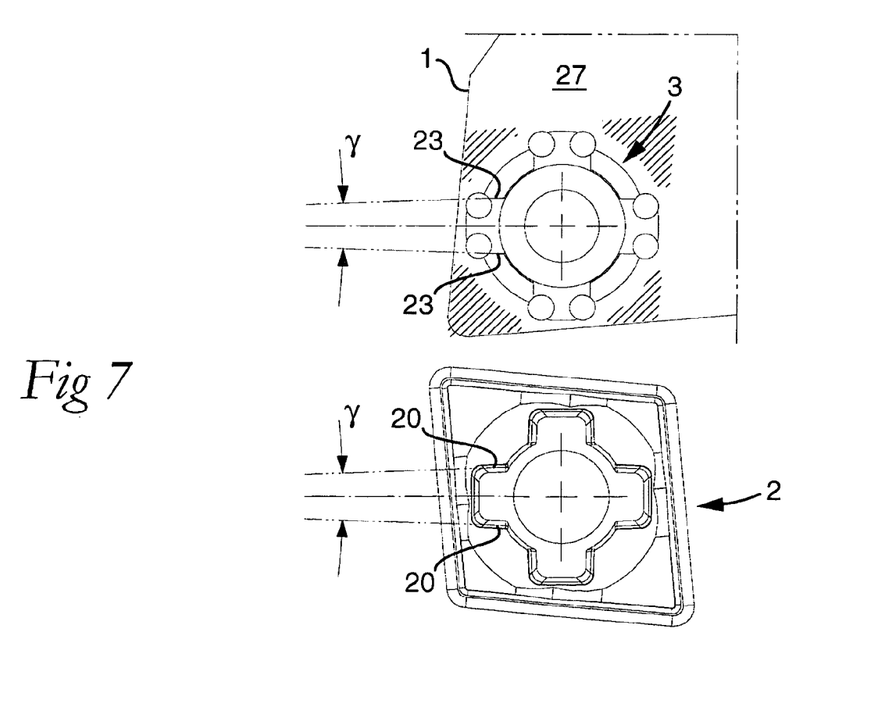
FIG. 7 is an analogous exploded view showing the insert seat and the cutting body in a state in which the male member of the cutting body is imagined to be pressed into and fixed in an end position in the insert seat.

Now reference is made particularly to FIGS. 6 and 7, where FIG. 6 shows the cutting body 2 in dismounted state (compare FIG. 8), while FIG. 7 illustrates the cutting body 2 in an (imaginary) state in which the cutting body 2 has been fixed in the insert seat 3 (compare FIG. 10). As previously pointed out, the wedge surfaces 20 converge not only axially, but also radially, viz. in the angle of convergence γ, irrespective of the cutting body 2 being mounted or not, such as is seen by a comparison between FIGS. 6 and 7. However, this does not apply for the co-operating support surfaces 23 adjacent to the individual seat 21. Because the two support surfaces 23 of one and the same projection 22 are located perpendicularly to each other, the two support surfaces 23 delimiting the individual seat 21 will, in the inactive state thereof according to FIG. 4, extend in the length extension of the symmetry plane P, so far that the upper and lower limiting lines 49, 50 of the surfaces are parallel to the symmetry plane P. As the free ends of the projections 22 are bent down toward the end position according to FIG. 10, the two support surfaces 23 will, however, form a successively increasing angle of convergence, viz. an angle that in the end position according to FIG. 7 corresponds with the radial angle of convergence γ of the wedge surfaces 20. In such a way, the good surface contact between the surfaces 20, 23 is guaranteed.

The design of the fingers 16 and the wedge surfaces 20 thereof as well as the support surfaces 23 of the co-operating seats may vary most considerably, provided that the axial angle of convergence α of the wedge surfaces 20 (see FIG. 11) is smaller than the angle of divergence δ of the support surfaces 23, at the same time as at least the wedge surfaces 20 of the fingers 16 converge in the radial direction (the angle of convergence γ in FIG. 6). In the embodiment of the tool shown in FIGS. 1-12, the axial angle of convergence α is preferably approximately 22° (α/2=11°), at the same time as the angle of divergence δ is preferably approximately 30° (δ/2=15°). The angles may vary upward as well as downward. However, the angle α is preferably at least 17° and at most 27°. A preferred range for these angular values is at least 19° and at most 25°, and with approximately 22° being more preferable.

In the example, the angle of divergence δ is preferably approximately 30°. Therefore, on each side of the finger 16, an axial clearance angle of 4° (i.e., 15°−11°=4°) is preferably obtained at the corner contact points 36, 55 according to FIG. 8. If the radial angle of convergence γ of the wedge surfaces 20 is preferably 4°, such as is the case in the example shown, on each side of the finger 16, a radial clearance angle of approximately 2° is obtained from the corner points 36, 55 toward the corner points 35, 54.

In practice, the angle of divergence δ should not exceed 35° or be below 25°. Preferably, the angle of divergence should be at most 33° and at least 27°, and approximately 30°.

Irrespective of what absolute values are chosen for the above-mentioned angles, the difference between the angles δ and α should preferably be at least 4° (which gives the clearance of 2° on each side of the finger 16). On the other hand, the angular difference should not exceed 16° (which would give a clearance of 8° on each side of the finger 16).

In the example, the radial angle of convergence γ (see FIG. 6) amounts to 4°, which gives a clearance of 2° on each side of the finger 16. Also this angle may vary upward as well as downward. However, the angle γ is preferably at least 1° (0.5° on each side), and more preferably at least 2°. On the other hand, the angle γ should not exceed 8°. Preferably, the highest value of the angle should be approximately 6°.

In this connection, it should be pointed out that the wedge surface 20 and the support surface 23 do not need to be equally large, neither in respect of the axial extension thereof nor the radial extension thereof. In fact, the surfaces in the example are differently sized. Thus, the wedge surface 20 is narrower than the support surface 23 so far that the axial extension H1 (see FIG. 11), i.e., the distance between the limiting lines 29 and 30, is somewhat smaller than the corresponding extension H2 of the support surface 23, i.e., the distance between the limiting lines 49 and 50. This means that surface contact is established along the entire wedge surface 20 as viewed in the axial extension thereof, such as is seen in FIG. 10.

However, regarded in the radial direction, the wedge surface 20 is somewhat longer than the support surface 23, i.e., the distance between the limiting lines 31, 32 of the wedge surface 20 (see FIG. 4) is somewhat greater than the distance between the limiting lines 56, 57 of the support surface 23 (FIG. 5).

An advantage of the connecting interface of the tool according to the invention is that the cutting body 2 can be detached from the insert seat 3 of the basic body 1 in a simple and fast way. This is the result of the support surfaces 23 in the seats 21 in the insert seat 3 being formed with an angle of divergence δ that is greater than the angle of convergence a of the wedge surfaces 20 of the fingers 16. Therefore, when the screw 5 is loosened and allows the elastic projections 22, on which the support surfaces 23 are formed, to spring upward, a clearance is immediately established between the respective surfaces 20, 23, an upwardly directed force being applied to the fingers 16 and thereby to the cutting body 2, which force aims to lift the cutting body 2 out of the insert seat 3. However, even if the lifting is not particularly powerful (e.g., the cutting body 2 does not jump up by itself), in all events, it is guaranteed that the tendency of the surfaces 20, 23 to self-locking is eliminated. Therefore, as soon as the screw 5 has been removed, the operator can simply pick away the cutting body 2 using the fingers of the hand.

Another advantage of the invention is that good surface contact is obtained between the wedge surfaces 20 of the fingers 16 and the support surfaces 23 of the elastic projections 22 during the deflection of the projections 22, as a consequence of the wedge surfaces 20 of the fingers 16 converging not only axially, but also radially. This means that a moderate radial clearance initially is present between the wedge surfaces 20 and the support surfaces 23, but as the elastic projections 22 are bent down, this clearance will successively decrease in order to finally cease in a state in which complete surface contact has been established, because the wedge and support surfaces 20, 23 in this state coincide in one and the same solid-geometrical position.

Another practical advantage of the invention is that the fingers 16 of the cutting body 2 easily enter into the appurtenant seats 21, as a consequence of the lower end portions of the fingers 16 being limited by guide surfaces 37, which converge even more than the wedge surfaces 20. In other words, the operator's possibilities of quickly inserting the male member 4 of the cutting body 2 into the insert seat 3 are significantly improved.

Figure 13:
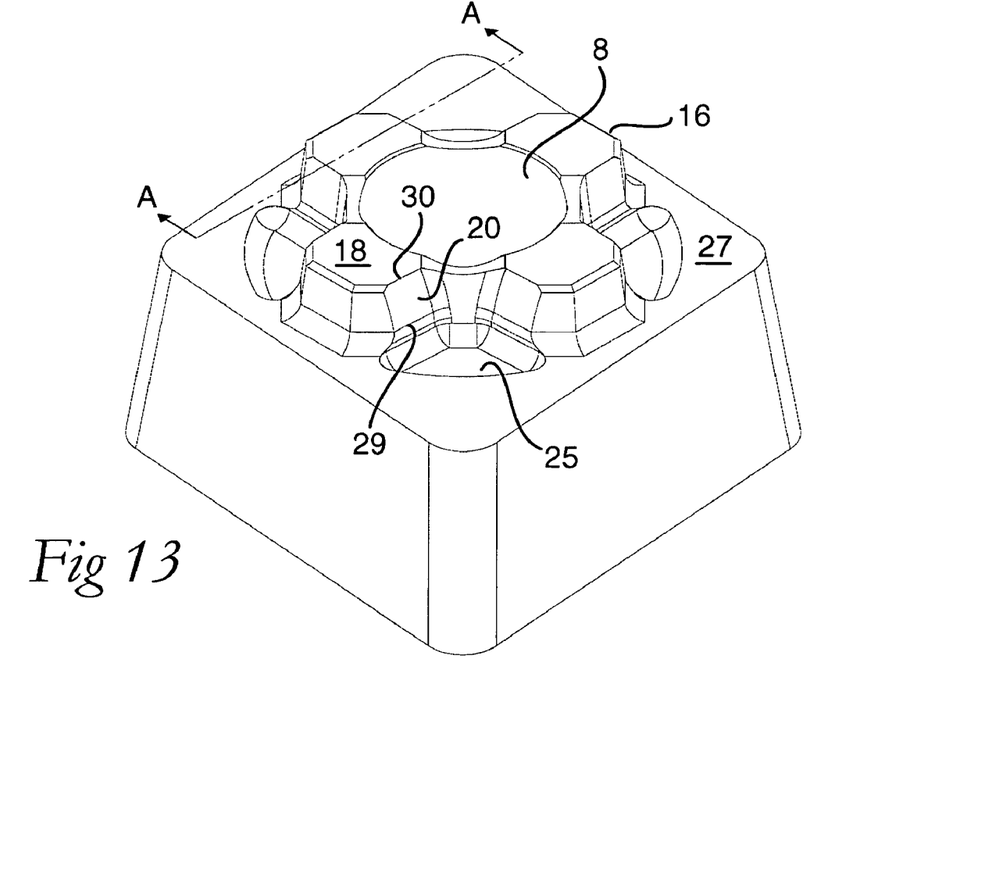
FIG. 13 is a perspective view showing the underside of a cutting insert having a male member according to an alternative embodiment of the invention.
Figure 14:
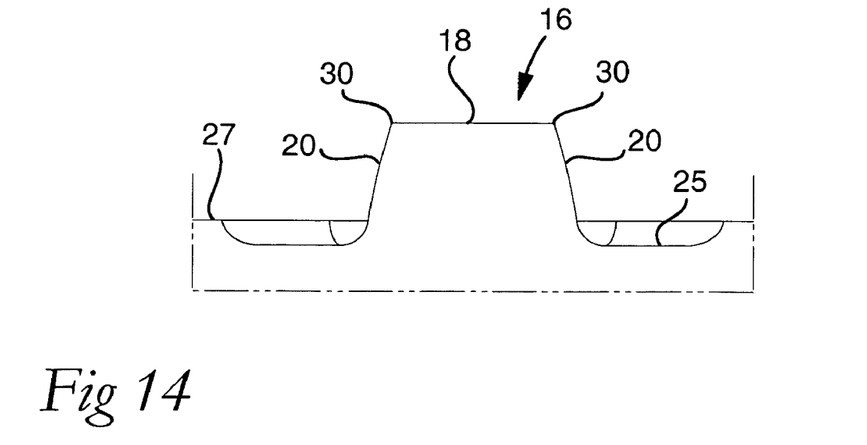
FIG. 14 is a cross section A-A in FIG. 13.

In FIGS. 13 and 14, an alternative embodiment of a cutting body according to the invention is shown. In this case, the wedge surfaces 20 on the opposite sides of each individual finger 16 are made with an arched shape, instead of a planar. Advantageously, the arched shape extends all the way between the upper and lower limiting lines of the surface, the lower limiting line 30 forming a turning line in direct connection to the underside 18 of the finger 16. Also in this embodiment, the lower end portion of the finger 16 is, such as this is defined by the distance between the turning lines 30 along the underside 18, considerably thinner than the width of the individual seat 21, such as this is defined by the distance between the opposite limiting lines 49 of the seat (see FIG. 5).

The two embodiments of the cutting body, which are shown in FIGS. 1-12 and 13-14, respectively, are formed with a male member 4 only on one side thereof, viz. the underside, the cutting body 2 being formed with four pairs of edges and the male member 4 including equally many fingers 16. This means that the cutting body 2 is indexable in four positions, but not turnable. However, in FIG. 15, an alternative embodiment of the tool according to the invention is illustrated, the cutting body being indexable as well as turnable. In this case, the insert seat 3 is formed with a number of seats 21, which are delimited between elastically resilient projections 22, which protrude from the planar surface 27 of the basic body 1, instead of being countersunk under the surface 27, such as has been described previously. In the generally flat cutting body 2, a through hole 8 is formed, i.e., a hole that opens in opposite surfaces 12, wherein each surface 12 alternately can form either an underside or a top side. Adjacent to each such surface 12, fingers 16 are formed in the same number as the number of seats 21. The fingers 16 point in the direction inward from the surrounding hole wall. Also in this case, each individual finger 16 includes two opposite wedge surfaces 20, which in a previously described way cooperate with pairs of support surfaces 23, which delimit the individual seats 21.

Figure 15:
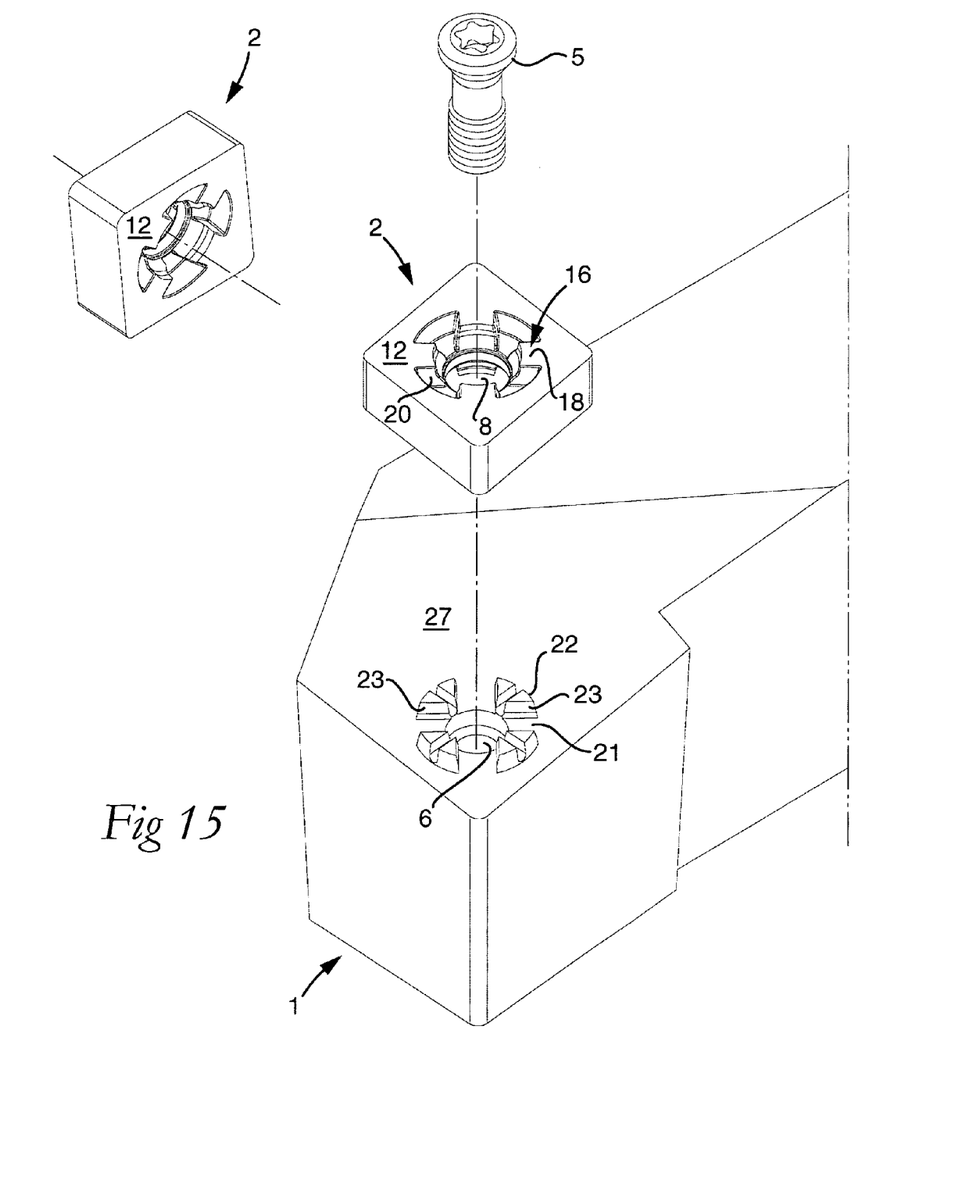
FIG. 15 is a perspective exploded view showing an alternative embodiment of the tool according to the invention, the cutting body of the tool not only being indexable, but also turnable.

However, in the embodiment according to FIG. 15, the projections 22 spring away laterally, as opposed to in the downward direction as has been described previously. For this reason, in this case the axial angle of convergence of the fingers 16 is greater than the angle of divergence of the support surfaces 23. Furthermore, in this case the fingers 16 do not need to converge in the radial direction, because no deflection of the projections takes place. However, it still applies that the angle of divergence of the support surfaces and the angle of convergence of the wedge surfaces differ, and that the angular differences or clearances have the previously mentioned values.

The invention is not only limited to the embodiments described above and illustrated in the drawings. Thus, the invention is applicable to fixed tools, e.g., for turning, as well as rotatable tools, for, for instance, drilling, milling, etc., wherein the cutting bodies of the tools may have a basic shape that deviates most considerably from the shown, tetragonal shape of the cutting plate. For instance, the cutting body may have a round, e.g., circular or elliptical basic shape, instead of polygonal. Most preferably, the edge-carrying part of the cutting body and the set or sets of male-like fingers are formed in a single piece of a hard material. In addition to cemented carbide, this material may be, for instance, cermets, ceramics, or the like. However, it is also feasible to make the cutting body and the male member provided with fingers in the form of two separate units, which are permanently united to each other in a suitable way. Furthermore, it is possible form the insert seat and the bendable projections thereof in another way than by machining (drilling, milling) the basic body of the tool. Hence, it is possible to form the elastic projections in the form of parts of a washer or ring, which forms an insert that is fixed in a suitable way, e.g., is laser welded, adjacent to a hole in the basic body.

Neither is the invention limited to the use of exactly a screw as a tightening member for the fixation of the cutting body. Thus, reliable clamping of the cutting body may also be provided by means of clamps or the like. Furthermore, the number of fingers of the cutting body does not need to correspond with the number of receiving seats in the insert seat, provided that the number of seats is greater than the number of fingers. For instance, the cutting body could have three fingers with a spacing of 120°, while the insert seat could have six seats with a spacing of 60°. In this connection, for the sake of completeness, it should also be pointed out that the number of fingers of the cutting body may vary from two and upward.

The concept of "basic body" should be interpreted in a wide sense. Thus, the basic body in which the seats of the insert seat for the fingers are formed may be in the form of not only a traditional tool holder (boring bar, milling cutter head, drill body, etc.), but also of an attachment, e.g., a shim plate, which in turn is fixed in a suitable way on a tool holder.

Concerning the clearances that are required to realize the general idea of the invention, it should be pointed out that the same may be partial, in the sense that they are present only along a part of the wedge and support surfaces, respectively, (such as is the case in the embodiment according to FIGS. 13 and 14). In other words, the clearance does not need to be achieved all the way along the wedge and support surfaces, respectively, which both are planar.

Although the support surfaces of the elastic projections extend parallel to the symmetry plane of the individual seat, it is within the scope of the invention also feasible to make the surfaces having a certain, radial convergence provided that the angle of convergence is smaller than the radial angle of convergence of the wedge surfaces.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A tool for chip removing machining, comprising:
   a basic body;
   a replaceable cutting body;
   a male/female coupling between the basic body and the cutting body, the male/female coupling including:
   a plurality of male-like fingers peripherally spaced-apart around an axis, each individual finger including an underside, a free end, and a pair of opposite wedge surfaces converging at axial angle of convergence toward the underside; and
   at least equally as many spaced-apart seats into which the fingers can be pressed axially, each seat being delimited between elastically resilient projections defining pairs of support surfaces of adjacent projections, the support surfaces diverging at an angle of divergence;
   wherein the fingers, upon pressing-in toward a lower end position, having the purpose of bending away the projections, while the fingers are wedged up between the projections and are subjected to a spring force from the same; and
   a tightening member fixing together the basic body and the cutting body;
   wherein the axial angle of convergence of the two wedge surfaces of each individual finger differs from the angle of divergence of the pair of cooperating support surfaces of the projections in the state when the projections are not loaded by the fingers.

2. The tool according to claim 1, wherein the difference between the angle of divergence of the support surfaces and the axial angle of convergence of the wedge surfaces being at least 2°.

3. The tool according to claim 1, wherein the difference between the angle of divergence of the support surfaces and the axial angle of convergence of the wedge surfaces being at most 16°.

4. The tool according to claim 1, wherein the axial angle of convergence of the wedge surfaces being at least 17°.

5. The tool according to claim 1, wherein the axial angle of convergence of the wedge surfaces being at most 27°.

6. The tool according to claim 1, wherein the plurality of fingers define a male member that projects from an underside of the cutting body, and the projections are located adjacent to a hollow space in the basic body and are bendable in the downward direction of the same, and wherein the wedge surfaces of each individual finger converge not only axially toward the underside of the finger, but also radially toward the free end of the finger.

7. The tool according to claim 1, wherein the plurality of fingers as well as the at least equally as many seats extend radially in relation to the axis, and the pair of wedge surfaces of each individual finger and the pair of cooperating support surfaces of the projections being situated at equally large distances from first and second symmetry planes intersecting along the axis, and wherein upper and lower limiting lines of each support surface are parallel to the second symmetry plane.

8. The tool a according to claim 1, wherein each individual wedge surface of a respective finger being at least partly convexly arched.

9. A cutting body of tools for chip removing machining, comprising:
- a plurality of male-like fingers peripherally spaced-apart around an axis, the fingers being situated in a common cross-plane with respect to the axis, and each of the fingers including an underside, a free end, and two wedge surfaces being formed on opposite sides;
- wherein the two wedge surfaces on a respective finger converge axially toward the underside of the finger at an axial angle of convergence, and also converge radially toward the free end of the finger at a radial angle of convergence; and
- guide surfaces being formed between lower limiting lines of the two wedge surfaces and the underside of each individual finger, the guide surfaces converging axially toward the underside at an angle that is greater than the axial angle of convergence of the wedge surfaces.

10. A cutting body of tools for chip removing machining, comprising:
- a plurality of male-like fingers peripherally spaced-apart around an axis, the fingers being situated in a common cross-plane with respect to the axis, and each of the fingers including an underside, a free end, and two wedge surfaces being formed on opposite sides;
- wherein the two wedge surfaces on a respective finger converge axially toward the underside of the finger at an axial angle of convergence, and also converge radially toward the free end of the finger at a radial angle of convergence; and
- chamfer surfaces being formed above upper limiting lines of the wedge surfaces, the chamfer surfaces forming an angle of more than 180° with the wedge surfaces.

11. A tool for chip removing machining, comprising:
- a male coupling disposed on a first one of a basic body and a replaceable cutting body, the male coupling including a plurality of fingers being disposed equi-angularly about an axis, each of the plurality of fingers includes an underside, a free end spaced from the axis, and a pair of opposite wedge surfaces extending to the free end and converging at axial angle of convergence toward the underside;
- a female coupling disposed on a second one of the basic body and the replaceable cutting body, the female coupling including a plurality of seats, each of the plurality of seats being defined by a corresponding pair of projections, and each of the projections including a support surface such that a pair of support surfaces defined by the corresponding pair of projections diverge at an angle of divergence that differs from the axial angle of convergence,
- wherein the tool comprises first and second configurations of the male and female coupling members, the first configuration being defined by the male and female coupling members being axially spaced apart such that the angle of divergence is greater than the axial angle of convergence, and the second configuration being defined by the male and female coupling members being axially pressed together such that each of the projections is resiliently deformed and corresponding pairs of the opposite wedge and support surfaces are contiguously engaged over a majority of the corresponding pairs of the opposite wedge and support surfaces.

12. The tool according to claim 11, further comprising a tightening member axially pressing together the male and female coupling members in the second configuration.

* * * * *